(12) United States Patent
Malzacher et al.

(10) Patent No.: US 10,570,743 B2
(45) Date of Patent: Feb. 25, 2020

(54) TURBOMACHINE HAVING AN ANNULUS ENLARGMENT AND AIRFOIL

(71) Applicant: MTU Aero Engines AG, Munich (DE)

(72) Inventors: Franz Malzacher, Groebenzell (DE); Markus Brettschneider, Munich (DE)

(73) Assignee: MTU Aero Engines AG, Munich (DE)

( * ) Notice: Subject to any disclaimer, the term of this patent is extended or adjusted under 35 U.S.C. 154(b) by 750 days.

(21) Appl. No.: 14/966,121

(22) Filed: Dec. 11, 2015

(65) Prior Publication Data

US 2016/0168998 A1   Jun. 16, 2016

(30) Foreign Application Priority Data

Dec. 12, 2014   (DE) .................. 10 2014 225 689

(51) Int. Cl.
| | | |
|---|---|---|
| *F01D 9/04* | (2006.01) | |
| *F01D 5/14* | (2006.01) | |
| *F04D 29/28* | (2006.01) | |
| *F04D 29/32* | (2006.01) | |
| *F04D 29/44* | (2006.01) | |
| *F01D 5/02* | (2006.01) | |

(52) U.S. Cl.
CPC ............. *F01D 5/141* (2013.01); *F01D 5/02* (2013.01); *F01D 5/143* (2013.01); *F01D 5/145* (2013.01); *F01D 9/041* (2013.01); *F04D 29/284* (2013.01); *F04D 29/324* (2013.01); *F04D 29/444* (2013.01); *F05D 2260/97* (2013.01); *Y02T 50/673* (2013.01)

(58) Field of Classification Search
CPC .......... F01D 5/141; F01D 5/143; F01D 5/145; F01D 9/041; F01D 29/681; F01D 29/685
See application file for complete search history.

(56) References Cited

U.S. PATENT DOCUMENTS

| | | |
|---|---|---|
| 4,832,567 A | 5/1989 | Bessay |
| 5,791,873 A | 8/1998 | Kreitmeier |
| 6,508,630 B2 | 1/2003 | Liu et al. |
| 6,561,761 B1 | 3/2003 | Decker et al. |
| 6,705,834 B1 | 3/2004 | Jacobsson |
| 7,011,495 B2 * | 3/2006 | Guemmer ............... F01D 5/142 |
| | | 415/199.5 |
| 7,189,056 B2 | 3/2007 | Girgis |

(Continued)

FOREIGN PATENT DOCUMENTS

| | | |
|---|---|---|
| DE | 10233033 | 1/2004 |
| DE | 102007020025 | 10/2008 |

(Continued)

*Primary Examiner* — David E Sosnowski
*Assistant Examiner* — Sabbir Hasan
(74) *Attorney, Agent, or Firm* — Davidson, Davidson & Kappel, LLC

(57) ABSTRACT

Disclosed is a turbomachine including a stator, a rotor rotatable about an axis of rotation, and an annulus for carrying a core flow, the annulus having a side wall on the stator and a side wall on the rotor, at least one airfoil array having a plurality of airfoils being disposed in the annulus. In a departure from an ideal aerodynamic annulus contour, a radial annulus enlargement begins upstream of the airfoils and extends downstream up to an aft portion of the airfoil array that follows the ideal aerodynamic annulus contour. Also disclosed is an airfoil for such a turbomachine.

9 Claims, 3 Drawing Sheets

(56) References Cited

U.S. PATENT DOCUMENTS

| | | |
|---|---|---|
| 8,192,154 B2 | 6/2012 | Sonoda et al. |
| 8,602,740 B2 | 12/2013 | O'Hearn et al. |
| 2010/0146988 A1 | 6/2010 | Steiger et al. |
| 2011/0225979 A1 | 9/2011 | Hoeger et al. |
| 2012/0275911 A1 | 11/2012 | Miyoshi |
| 2012/0315136 A1* | 12/2012 | Sonoda ................ F04D 29/526 415/210.1 |
| 2013/0195641 A1 | 8/2013 | Povey |

FOREIGN PATENT DOCUMENTS

| | | |
|---|---|---|
| EP | 0799973 | 10/1997 |
| EP | 0943784 | 9/1999 |
| EP | 1126132 | 8/2001 |
| EP | 1267042 | 12/2002 |
| EP | 1382797 | 1/2004 |
| FR | 996967 | 12/1951 |
| WO | WO2013/130181 | 9/2013 |

* cited by examiner

TURBOMACHINE HAVING AN ANNULUS ENLARGMENT AND AIRFOIL

This claims the benefit of German Patent Application DE 10 2014 225 689.5 filed Dec. 12, 2014 and hereby incorporated by reference herein.

The present invention relates to a turbomachine and to an airfoil for a turbomachine.

BACKGROUND

In turbomachines, such as aircraft engines and stationary gas turbines, a substantial portion of the losses is caused by a decelerated flow in the gas-carrying flow duct or annulus. Depending on the permissible deceleration values in connection with an ideal annulus, this results in corresponding geometric limitations.

In order to reduce flow losses in the annulus, European Patent Application EP 0 943 784 A1 illustrates an axial turbomachine having multiple stages of airfoils, in which the annulus contour formed by a side wall of the rotor and a side wall of the stator is periodically undulated on the rotor side in the axial direction, and has a depression on the stator side opposite an elevation on the rotor side.

European Patent Application EP 0 799 973 A1 describes a turbomachine having an annulus contour that is provided with a kink angle immediately at the outlet of a rotor blade array. The kink angle is to be dimensioned such that an exit flow from the rotor blade array is homogenized in terms of total pressure and exit flow angle. A downstream stator vane array is provided with a corresponding opposing angle on the inlet side thereof.

SUMMARY OF THE INVENTION

It is an object of the present invention to provide a turbomachine having reduced flow losses in the annulus, as well as an airfoil for such a turbomachine.

The present invention provides a turbomachine having a stator, a rotor rotatable about an axis of rotation, and an annulus for carrying a core flow. The annulus is bounded by a side wall of the stator and a side wall of the rotor. At least one airfoil array having a plurality of airfoils is disposed in the annulus. In accordance with the present invention and in a departure from an ideal aerodynamic annulus contour, a radial annulus enlargement begins upstream of the airfoils and extends downstream up to an aft portion of the airfoil array that follows the ideal aerodynamic annulus contour.

An "ideal aerodynamic annulus contour" is understood to be, at the temperatures and the rotational speed at the aerodynamic design point, a cavity-free or axial-gap-free annulus that corresponds, or substantially corresponds, to an extrapolation of the side walls of the stator and the rotor. Due to the cavity-free design, the ideal aerodynamic annulus contour extends in a substantially step- or kink-free manner between two airfoil arrays.

An array control volume at the inlet of the airfoil array is increased by the at least one radial annulus enlargement, as a result of which a flow velocity at the inlet and toward the downstream portion of the airfoil array is lowered. This also decreases an average Mach number level in the entire array control volume. Since pressure losses are, in a first approximation, proportional to the square of the velocity, the pressure losses decrease. Thus, a potential loss caused by the annulus enlargement is more than compensated for. In addition, the generation of noise by the turbomachine is reduced at lower velocities. The radial annulus enlargement may be formed both in the compressor section and in the turbine section, particularly in the high-pressure turbine (HPT), in a deflecting array downstream of the HPT toward the turning mid-turbine frame (TMTF), in a non-deflecting array in the so-called turbine center frame (TCF), in the low-pressure turbine (LPT), and in the so-called turbine exit casing, so that a respective relevant deceleration can be reduced throughout the entire core flow.

In this connection, one uses the effect that there is often a cavity present in airfoil arrays, where, again and again, a new boundary layer begins. This is used to enlarge an effective cross-sectional area for the annulus and to deviate from an original annulus shape. This lowers the local velocity level at the inlet and the average velocity level in the array control volume, which results in a reduction in aero-thermodynamic losses.

If the at least one radial annulus enlargement is formed in the turbine section, it is advantageous that the radial annulus enlargement extend up to a throat between two adjacent airfoils. This throat is the region of minimum distance between two adjacent airfoils.

If the at least one radial annulus enlargement is formed in the compressor section, it is preferred that the radial annulus enlargement span about 70%; i.e., between 65% and 75%, of the array width. The aft portion of the at least one airfoil array, which follows the ideal aerodynamic annulus contour, corresponds to the difference to the total array width; i.e., here about 30%.

In an alternative exemplary embodiment, the annulus enlargement is formed on two (i.e., both) sides; i.e., on the stator side and on the rotor side. Thus, there are formed an annulus enlargement on the stator and an annulus enlargement on the rotor; i.e., the annulus enlargement includes a recessed portion on the stator and a recessed portion on the stator. This feature allows the array control volume to be at least doubled compared to a one-sided annulus enlargement, while at the same time preventing a radial offset of the flow incident on the airfoil array.

Preferably, a side wall portion radially outwardly bounding at least one radial annulus enlargement exhibits a stepless profile. The side wall portion may be formed both on the stator and on the rotor.

An alternative side wall portion exhibits a step-like profile. In comparison with the stepless profile, the step-like profile reduces the annulus enlargement abruptly.

Due to the annulus enlargement, the airfoils preferably have a leading edge that is lengthened by at least 2% compared to airfoils which would follow the ideal aerodynamic annulus contour at the same position. In particular, it is preferred for the airfoils to have a leading edge that is lengthened by at least 5%. However, a leading edge lengthened by 14% has also proved to be advantageous. Due to the increase in length of the leading edges, the ideal aerodynamic annulus does not intersect the leading edges in a region where they merge into the side walls, but at a point that is radially spaced apart from the side walls; i.e., that is radially offset from a center of the annulus, viewed from the side walls.

Preferably, at least two adjacent airfoil arrays have the radial annulus enlargement. Thus, at the transition from one airfoil array to an adjacent downstream airfoil array which has the radial annulus enlargement, a so-called setback from an ideal aerodynamic annulus is created in the annulus.

In addition to the radial annulus enlargement, local sidewall contours, such as elevations and depressions, may be provided. The side-wall contours are preferably referred to a zero level for the ideal aerodynamic annulus without side-wall contours.

An airfoil according to the present invention has at least one platform contour having a forward portion that is radially enlarged compared to an ideal aerodynamic annulus contour and an aft portion that follows the ideal aerodynamic annulus contour and merges into the forward portion. Due to this feature, the annulus widens compared to an ideal aerodynamic annulus, starting in the upstream region of an array of vanes or blades. In this connection, either the radially inner side wall is sunk radially inwardly and/or the radially outer side wall is elevated radially outwardly.

Other advantageous exemplary embodiments of the present invention are the subject matter of further dependent claims.

BRIEF DESCRIPTION OF THE DRAWINGS

Preferred exemplary embodiments of the present invention are described in more detail with reference to schematic diagrams, in which.

DETAILED DESCRIPTION

Figure 1:
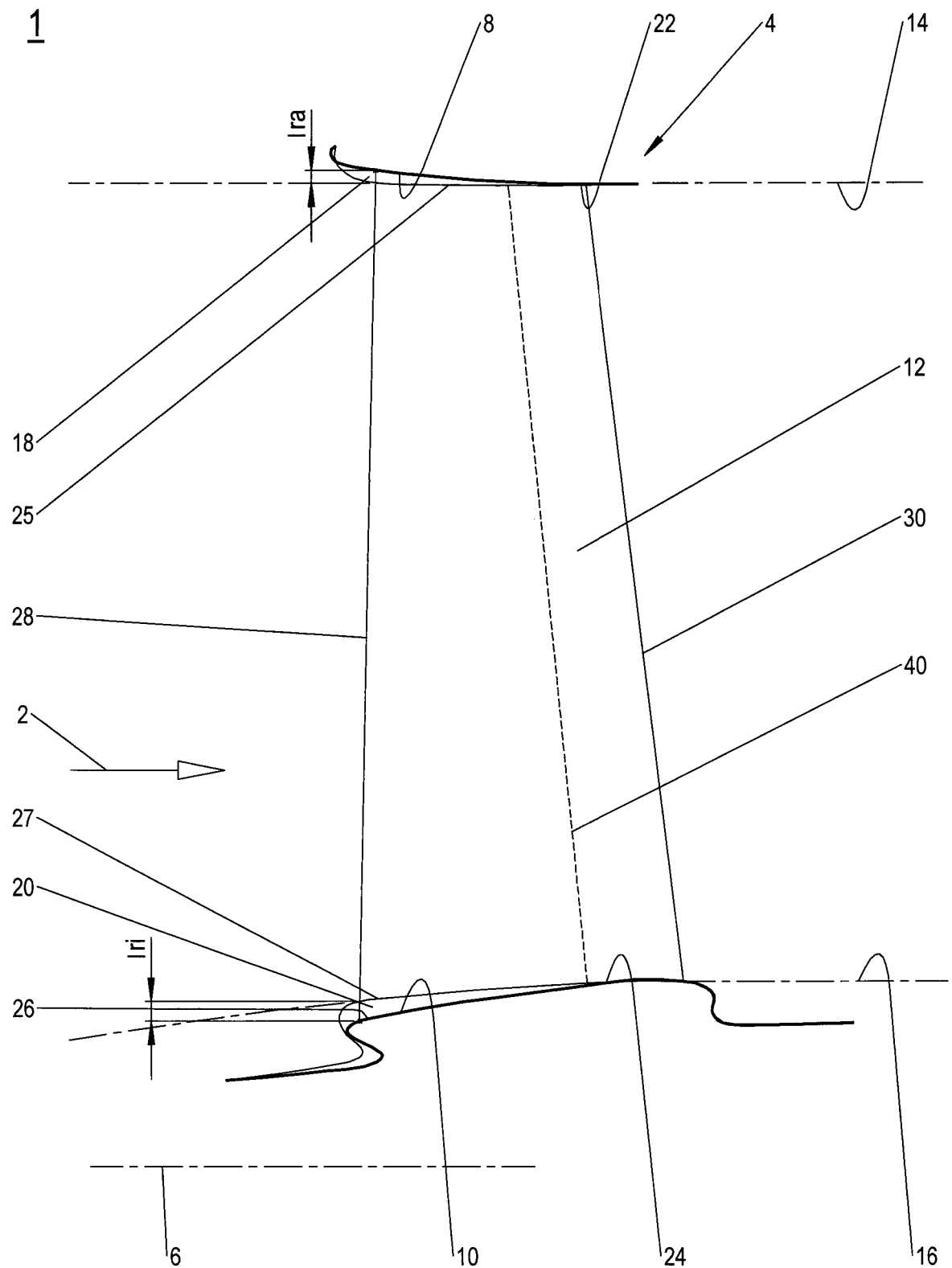
FIG. 1 shows an exemplary embodiment of an annulus of a turbomachine in the region of an inventive radial annulus enlargement that begins upstream of an airfoil array in the turbine section.

In FIG. 1, an annulus 1 of an inventive turbomachine, which annulus is adapted to carry a core flow 2, is shown in side view in the region of an airfoil array 4, here a rotor blade array. Core flow 2 flows from left to right through annulus 1, as shown by the arrow. The turbomachine is, for example, an aircraft engine and has, in addition to annulus 1, a stator and a rotor supported in the stator such that it is rotatable about a schematically indicated axis of rotation 6.

Referred to axis of rotation 6, annulus 1 is radially outwardly bounded by a side wall 8 of the stator and radially inwardly bounded by a side wall 10 of the rotor. Airfoil array 4 is non-rotatably connected to the rotor, and its radially inner platform ring forms a part of rotor side wall 10. In this exemplary embodiment, a portion of stator side wall 8 is formed by a radially outer platform ring of airfoil array 4, but may also be formed by abradable elements provided on the stator for airfoil tips of airfoil array 4.

Airfoil array 4 includes a plurality of airfoils 12 arranged circumferentially adjacent one another. Each airfoil 12 forms a portion of the platform rings with its own radially inner platform, and here also with its own radially outer platform.

In accordance with the present invention, in a departure from an ideal aerodynamic annulus contour 14, 16 indicated by a dash-dot line, two radial annulus enlargements 18, 20 begin upstream of airfoils 12 and extend downstream up to an aft portion 22, 24 of airfoil array 4, which follows the ideal aerodynamic annulus contour 14, 16.

In this connection, an ideal aerodynamic annulus contour 14, 16 is understood to be a cavity-free or axial-gap-free annulus that corresponds, or substantially corresponds, to an extrapolation of side walls 8, 10 of the stator and the rotor. Due to a cavity-free design, the ideal aerodynamic annulus contour 14, 16 extends in a substantially step- or kink-free manner between adjacent airfoil arrays 4.

An array control volume at the inlet of airfoil array 4 is increased by radial annulus enlargements 18, 20, as a result of which a flow velocity at the inlet and toward the downstream portions 22, 24 of airfoil array 4 is lowered. This also decreases an average Mach number level in the entire array control volume. Consequently, since pressure losses are, in a first approximation, proportional to the square of the velocity, the pressure losses decrease. Thus, a potential loss caused by radial annulus enlargements 18, 20 is more than compensated for. In addition, the generation of noise by the turbomachine is reduced at lower velocities.

One annulus enlargement 18 is formed on the stator and the other annulus enlargement 20 is formed on the rotor. Generally, it can also be said that an annulus enlargement is formed on two (i.e., both) sides. The annulus enlargements are achieved by recessing stator side wall 8 and rotor side wall 10. In order to graphically illustrate the annulus enlargements, platform ring profiles 25, 27 of a conventional airfoil array are plotted in FIG. 1 at the same positions.

Stator-side annulus enlargement 18 is preferably achieved in that the radially outer platform ring of airfoil array 4 is radially outwardly set back on the inlet side and in that the radially outer platform exhibits a stepless, radially inwardly directed profile toward its aft portion 22 up to where it merges into aft portion 22, which follows the ideal aerodynamic annulus contour 14.

Rotor-side annulus enlargement 20 is preferably configured in a stepped fashion on the inlet side of the radially inner platform ring of airfoil array 4. Downstream of a step 26 located radially inwardly from ideal aerodynamic annulus contour 16, the radially inner platform ring exhibits a stepless profile. Downstream of step 26, the radially inner platform ring merges radially outwardly into aft portion 24 which follows the ideal aerodynamic annulus contour 16.

As a design consequence of the two-sided radial annulus enlargement 18, 20, leading edges 28 of airfoils 12 are radially lengthened compared to leading edges of airfoils which would follow the ideal aerodynamic annulus contour 14, 16 at the same position. Preferably, leading edges 28 of the airfoils have experienced a total increase in length lri+lra of at least 2%, in particular 5%. Since the aft portions 22, 24 follow the ideal aerodynamic annulus contour 14, 16, trailing edges 30 of airfoils 12 remain unchanged; i.e., unlengthened, as compared to conventional airfoils at the same position.

Figure 2:
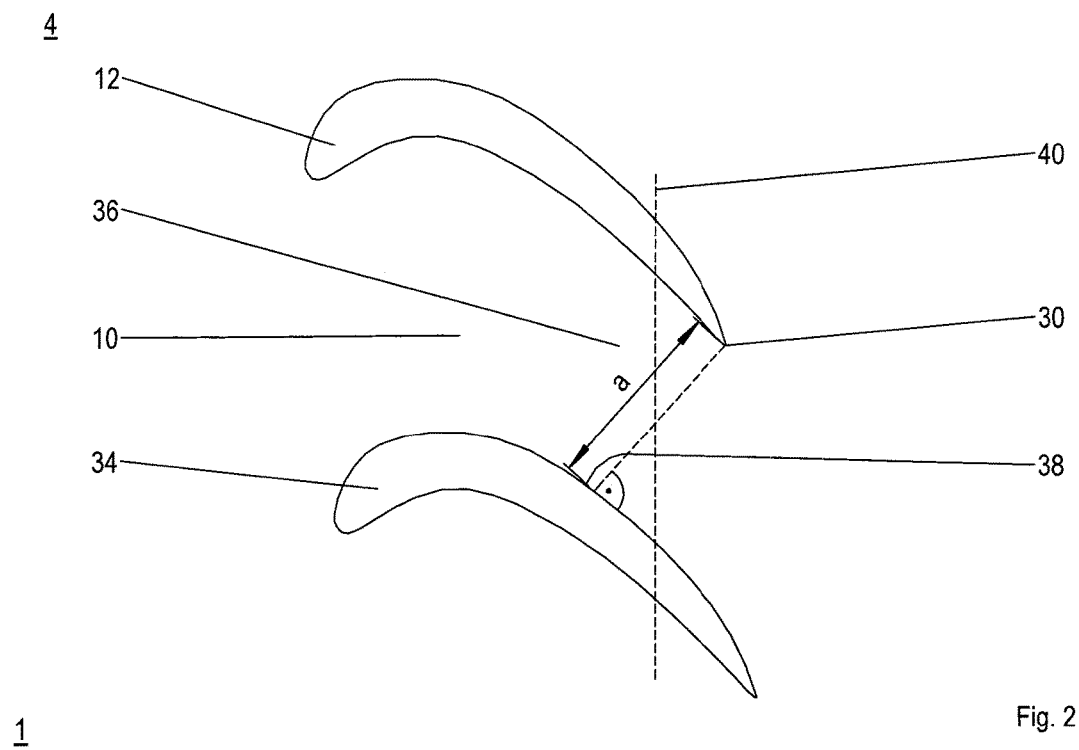
FIG. 2 shows a plan view of an angled circumferential portion of the array of turbine airfoils of FIG. 1.

As illustrated by a developed circumferential portion of airfoil array 4 in FIG. 2 in a view looking at inner platform ring 10, radial annulus enlargements 18, 20 in the turbine section preferably extend up to a throat 36 between two adjacent airfoils 12, 34 of the airfoil array. Throat 36 is located at the smallest distance a between adjacent airfoils 12, 34 and generally represents a smallest cross-sectional area of a flow channel circumferentially bounded by two adjacent airfoils 12, 34. Smallest distance a is determined by dropping the perpendicular from a suction-side portion 38 of one rotor blade 34 to trailing edge 30 of adjacent blade 12. Thus, in the case of turbine airfoil array 4, throat 36 is located on the outlet side. In this connection, a virtual contact line 40 is taken as an axial boundary for annulus enlargements 18, 20. Virtual contact line 40 is located centrally with respect to throat 36 between airfoils 12, 34 and extends in the circumferential direction. In particular, it is located upstream of trailing edges 30 and, thus, is axially spaced therefrom (see also FIG. 1), so that trailing edges 30 are located in the portions 22, 24 that follow the ideal aerodynamic annulus contour 14, 16.

Figure 3:
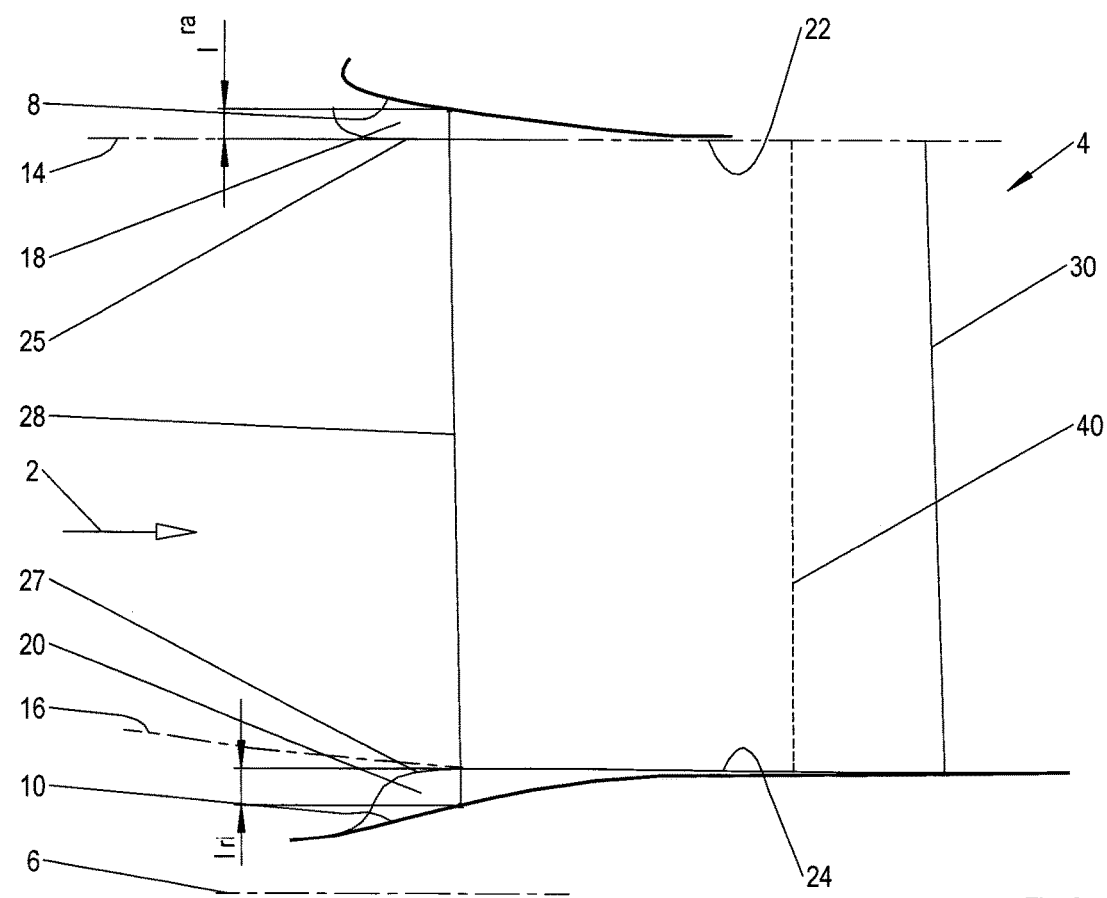
FIG. 3 shows an exemplary embodiment of an annulus of a turbomachine in the region of an inventive radial annulus enlargement that begins upstream of an airfoil array in the compressor section.

In FIG. 3, an annulus 1 of a turbomachine is shown in the region of an airfoil array 4 in the compressor section, in particular a stator vane array, having an annulus enlargement 18 on the stator and an annulus enlargement 20 on the rotor. Compared to an ideal aerodynamic annulus contour 14, 16, annulus enlargements 18, 20 are each implemented by radial recesses in side walls 8, 10 of annulus 1. In the region of airfoil array 4, side walls 8, 10 are formed by a radially outer platform ring and a radially inner platform ring of airfoil array 4.

Similar to the previous exemplary embodiment, stator-side annulus enlargement 18; i.e., the radially outer platform ring, is stepless in configuration. In contrast to the previous exemplary embodiment, rotor-side annulus enlargement 20 is also stepless, so that a platform ring of airfoil array 4, which is radially inwardly set back on the inlet side, exhibits a stepless profile and merges also steplessly and radially outwardly into its aft portion 24 at the height of the ideal aerodynamic annulus contour 14.

Figure 4:
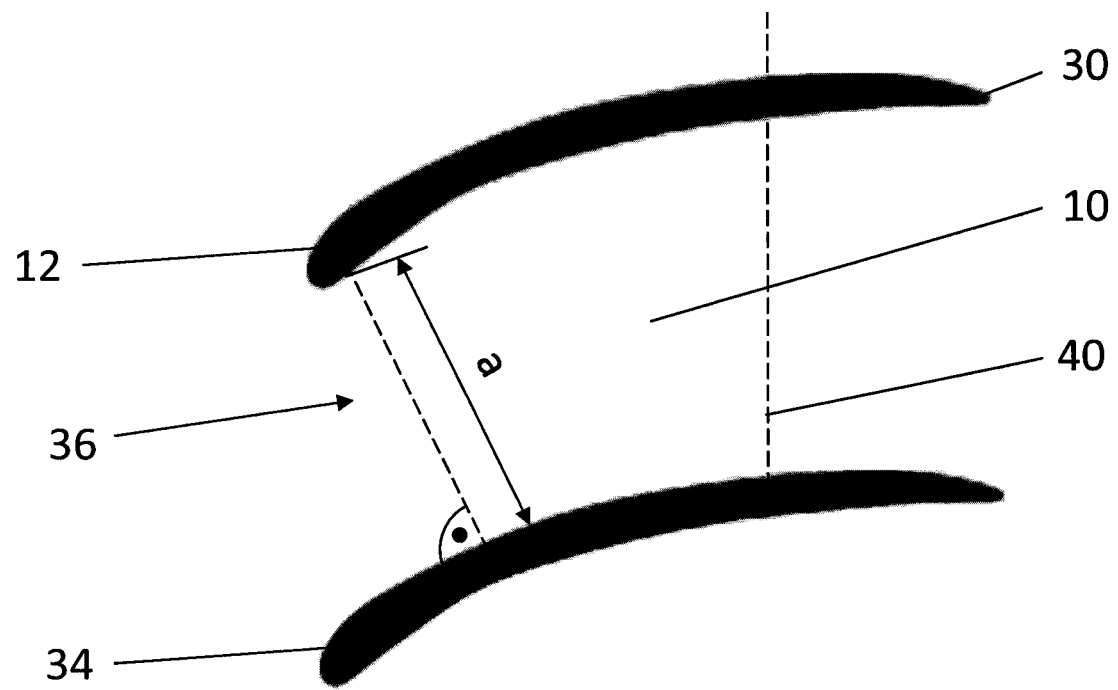
FIG. 4 shows a plan view of an angled circumferential portion of the array of compressor airfoils of FIG. 3.

In contrast to the radial annulus enlargements in the turbine section, and as indicated in FIG. 4, the radial annulus enlargements 18, 20 in the compressor section do not extend only up to throat 36 between two adjacent airfoils 12, 34 of airfoil array 4, but significantly therebeyond, because in the case of the airfoil array 4 in the compressor section, throat 36 is located on the inlet side. In the case of an airfoil array 4 in the compressor section, radial annulus enlargements 18, 20 extend up to an array width of about 70%; i.e., the aft portions 22, 24 of the at least one airfoil array 4 that follow the ideal aerodynamic annulus contours 14, 16 correspond to the difference to the total array width, which, in the exemplary embodiment shown here, is preferably about 30%.

In the exemplary embodiments illustrated in FIGS. 1 through 4, each annulus enlargement 18, 20 may, of course, also be independently disposed upstream of airfoil array 4, and thus in the region of a side wall portion of the stator or rotor that is located upstream of and adjacent to airfoil array 4.

Disclosed is a turbomachine including a stator, a rotor rotatable about an axis of rotation, and an annulus for carrying a core flow, the annulus having a side wall on the stator and a side wall on the rotor, at least one airfoil array having a plurality of airfoils being disposed in the annulus. In a departure from an ideal aerodynamic annulus contour, a radial annulus enlargement begins upstream of the airfoils and extends downstream up to an aft portion of the airfoil array that follows the ideal aerodynamic annulus contour. Also disclosed is an airfoil for such a turbomachine.

LIST OF REFERENCE NUMERALS 1 annulus
2 core flow
4 airfoil array
6 axis of rotation
8 side wall of the stator
10 side wall of the rotor
12 airfoil
14 ideal aerodynamic annulus contour
16 ideal aerodynamic annulus contour
18 annulus enlargement
20 annulus enlargement
22 aft portion
24 aft portion
25 conventional side wall profile
26 step
27 conventional side wall profile
28 leading edge
30 trailing edge
34 airfoil
36 throat
38 suction-side portion
40 contact line
a distance
lri increase in length at the radially inner side
lra increase in length at the radially outer side

What is claimed is:

1. A turbomachine comprising:
   a stator;
   a rotor rotatable about an axis of rotation; and
   an annulus for carrying a core flow, the annulus having a stator side wall and a rotor side wall, at least one airfoil array having a plurality of airfoils being disposed in the annulus, wherein in a departure from an ideal aerodynamic annulus contour, a radial annulus enlargement begins upstream of the airfoils and extends downstream up to an aft portion of the airfoils; wherein due to the annulus enlargement, the airfoils have a leading edge lengthened by at least 2% compared to airfoils following the ideal aerodynamic annulus contour at the same position and the aft portion follows the ideal aerodynamic annulus contour for at least 30% of an array width defined as a distance between a leading edge and a trailing edge of the airfoils of the at least one airfoil array.

2. The turbomachine as recited in claim 1 wherein the annulus enlargement extends up to a throat between two adjacent airfoils of the at least one airfoil array.

3. The turbomachine as recited in claim 1 wherein the annulus enlargement spans 70% of the array width defined as the distance between the leading edge and the trailing edge of the airfoils of the at least one airfoil array.

4. The turbomachine as recited in claim 1 wherein the annulus enlargement is formed on both the stator side wall and the rotor side wall.

5. The turbomachine as recited in claim 1 wherein a portion of the stator or rotor side wall bounding the annulus enlargement exhibits a stepless profile.

6. The turbomachine as recited in claim 1 wherein a portion of the stator or rotor side wall bounding the annulus enlargement exhibits a step-like profile.

7. The turbomachine as recited in claim 1 wherein at least two adjacent airfoil arrays have the radial annulus enlargement.

8. The turbomachine as recited in claim 1 wherein local side-wall contours are provided.

9. An airfoil for a turbomachine from the plurality of airfoils as recited in claim 1, the airfoil comprising: the leading edge lengthened by at least 2% and the aft portion following the ideal aerodynamic annulus contour.

* * * * *